United States Patent
Iwata et al.

(10) Patent No.: US 8,312,853 B2
(45) Date of Patent: Nov. 20, 2012

(54) VALVE SPRING DEVICE AND VALVE TRAIN OF ENGINE USING THE SAME

(75) Inventors: Kazuo Iwata, Yokohama (JP); Noritoshi Takamura, Yokohama (JP); Jun Tominaga, Yokohama (JP); Norihiro Tajima, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 357 days.

(21) Appl. No.: 12/704,750

(22) Filed: Feb. 12, 2010

(65) Prior Publication Data
US 2010/0139596 A1 Jun. 10, 2010

Related U.S. Application Data

(63) Continuation of application No. PCT/JP2008/064134, filed on Aug. 6, 2008.

(30) Foreign Application Priority Data

Aug. 15, 2007 (JP) ................................ 2007-211896

(51) Int. Cl.
*F01L 3/10* (2006.01)
(52) U.S. Cl. ................ 123/90.67; 123/90.16; 123/90.65
(58) Field of Classification Search ............... 123/90.65, 123/90.66, 90.67, 90.16
See application file for complete search history.

(56) References Cited

FOREIGN PATENT DOCUMENTS

| JP | 54-9207 | | 1/1979 |
|---|---|---|---|
| JP | 55-112008 | | 8/1980 |
| JP | 57-156647 | A | 9/1982 |
| JP | 8-177422 | A | 7/1996 |
| JP | 2000-240705 | A | 9/2000 |

OTHER PUBLICATIONS

Abstract for JP 08-177422; Jul. 1996.*
Int. Search Report for Int. Application No. PCT/JP2008/064134 dated Aug. 28, 2008.
International Preliminary Report on Patentability dated Mar. 18, 2010 (in English) in parent International Application No. PCT/JP2008/064134.
Japanese Office Action dated Feb. 14, 2012 (and English translation thereof) in counterpart Japanese Application No. 2007-211896.

* cited by examiner

*Primary Examiner* — Zelalem Eshete
(74) *Attorney, Agent, or Firm* — Holtz, Holtz, Goodman & Chick, PC

(57) ABSTRACT

A valve spring device is provided with a first coil spring and a second coil spring combined in series with each other. The inside diameter (coil inside diameter) of the second coil spring is greater than the outside diameter (coil outside diameter) of the first coil spring. A part of the first coil spring including an end portion along an axis is inserted into the second coil spring, thereby forming a combined spring. The end portion of the first coil spring and an end portion of the second coil spring are connected to each other by a connecting member. The first and second coil springs are compressed along the axis as they are located in series between a cylinder head and a retainer. A shaft of a valve is passed within the coil springs.

4 Claims, 5 Drawing Sheets

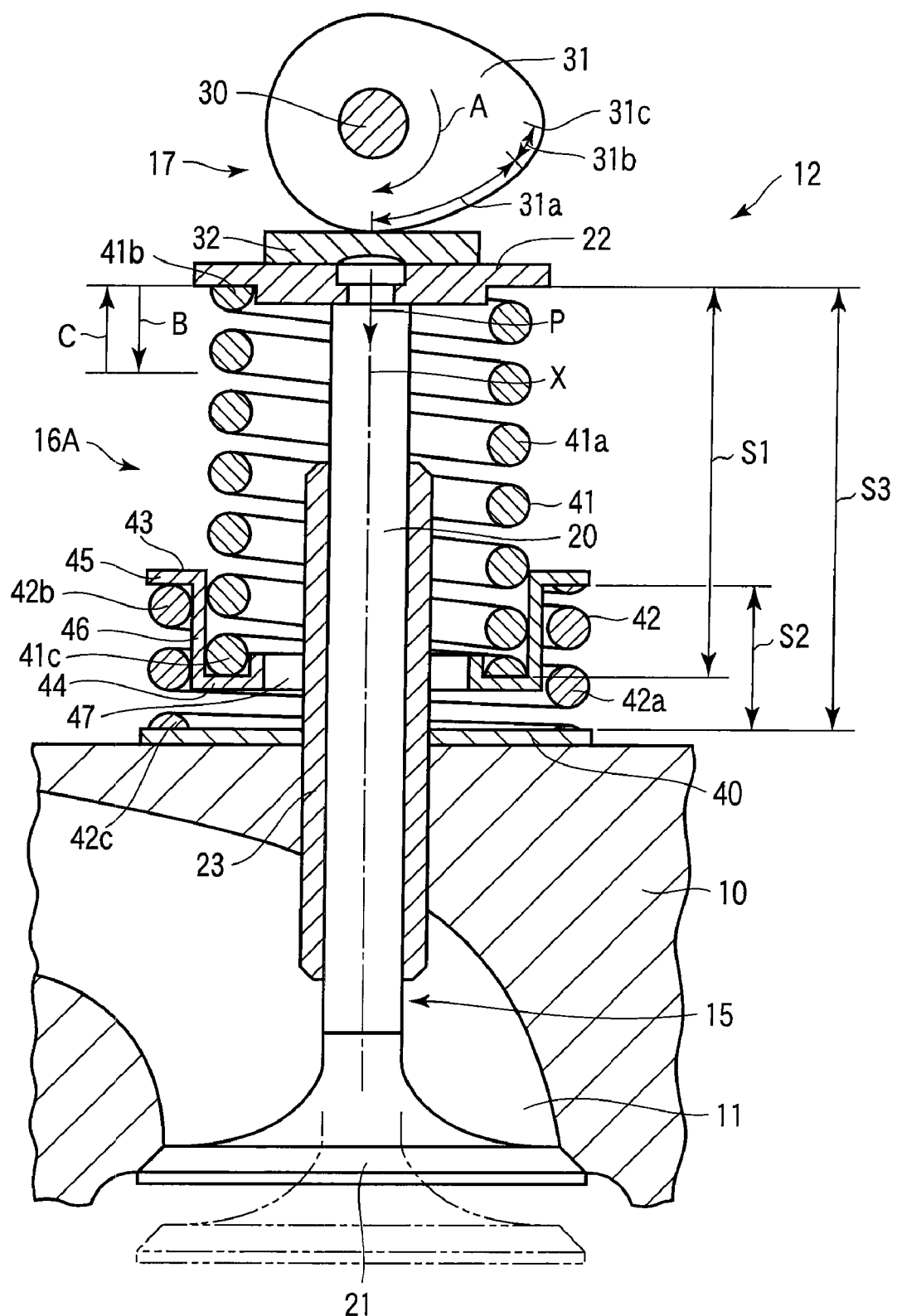
F I G. 1

VALVE SPRING DEVICE AND VALVE TRAIN OF ENGINE USING THE SAME

CROSS REFERENCE TO RELATED APPLICATIONS

This is a Continuation application of PCT Application No. PCT/JP2008/064134, filed Aug. 6, 2008, which was published under PCT Article 21(2) in Japanese.

This application is based upon and claims the benefit of priority from prior Japanese Patent Application No. 2007-211896, filed Aug. 15, 2007, the entire contents of which are incorporated herein by reference.

BACKGROUND OF THE INVENTION

1. Field of the Invention

The present invention relates to a valve spring device incorporated in an engine of, for example, an automobile and a valve train using the valve spring device.

2. Description of the Related Art

A valve train of an internal combustion engine (hereinafter referred to simply as the engine) includes an intake valve, an exhaust valve, a valve spring, a drive mechanism, etc. The valves serve individually to open and close ports in the cylinder head. The valve spring urges these valves in their closing direction. The drive mechanism is provided with a cam that drives the valves in their opening direction. A mounting load and a maximum load of the valve spring are set to appropriate values such that the valves do not undergo a jump or bounce when the engine is turning fast. The jump is a phenomenon that a valve that is opened or closed at high speed by a cam hops up above a predetermined open position near the maximum lift of the valve. The bounce is a phenomenon wherein the valve is repelled by a valve seat and fails to maintain a fully closed state when it is closed as the cam rotates.

It is generally known that the valve spring causes surge if it is driven at high speed when the engine is turning fast. If the surge occurs, the load of the valve spring fluctuates. In particular, a reduction of the load that is caused when the valve spring is deformed by the surge in a direction to compress itself brings about the jump or bounce. Thus, the maximum load of the valve spring is set to a relatively high value in consideration of the surge. The higher the load of the valve spring, however, the greater a friction loss of a valve train system is, so that the fuel efficiency of the engine may be worsened. Thus, the load of the valve spring is expected to be reduced.

On the other hand, a double-pitch coil spring has been proposed as a means to prevent an increase in surge. The double-pitch coil spring includes a small-pitch portion with smaller wire turn pitch and a large-pitch portion with larger pitch. If surge occurs, turns of the small-pitch portion repeat contact and separation, thereby suppressing the surge to a certain degree.

In this double-pitch coil spring, however, both the small-pitch and large-pitch portions vibrate to reduce the load, depending on the resonance frequency, when the surge increases. In some cases, therefore, the jump or bounce cannot be suppressed. In the double-pitch coil spring, moreover, a twisting vibration caused by the surge propagates from the large-pitch portion to the small-pitch portion. Thus, the double-pitch coil spring has a problem that its surge suppressing effect is not sufficiently high for a large surge, in particular.

A valve spring device for surge prevention is described in Jpn. Pat. Appln. KOKAI Publication No. 2000-240705. In this valve spring device, a valve spring, formed of a compression coil spring, and an elastically deformable washer are arranged in series with each other. A surge wave that is produced in the valve spring is elastically absorbed by the washer.

BRIEF SUMMARY OF THE INVENTION

In the valve spring device described in Jpn. Pat. Appln. KOKAI Publication No. 2000-240705, the two types of springs (compression coil spring and elastically deformable washer) are arranged in series with each other, so that the axial length (set height) of the device is substantial. Thus, a great force of inertia is generated when the engine is turning fast, for example, so that various problems arise. Since the valve train is thus increased in size, moreover, the upper part of the engine becomes bulkier.

Accordingly, the object of the present invention is to provide a valve spring device, capable of suppressing surge and reducing an axial dimension, and a valve train of an engine using the same.

The present invention is a valve spring device which urges a valve incorporated in a port of an engine in a valve-closing direction. The valve spring device comprises a first coil spring located on the side of a retainer of the valve and a second coil spring located on the side of a cylinder head and connected in series with the first coil spring. According to a first invention, an inside diameter of the second coil spring is greater than an outside diameter of the first coil spring, and a part of the first coil spring including an end portion along an axis is inserted into the second coil spring. According to a second invention, an inside diameter of the first coil spring is greater than an outside diameter of the second coil spring, and a part of the second coil spring including an end portion along an axis is inserted into the first coil spring. In either case, the respective end portions of the first and second coil springs are connected to each other by a connecting member. Further, a shaft of the valve is passed within the first and second coil springs, and the first and second coil springs are mounted compressed between the retainer and the cylinder head. The first and second coil springs have different spring characteristics.

According to the present invention, the first and second coil springs with different spring characteristics are combined in series with each other, so that the occurrence of surge can be suppressed. Since the two types of coil springs are arranged telescopically, moreover, the total axial length (set height) can be prevented from increasing, so that the force of inertia of the valve train that reciprocates at high speed can be reduced. The first and second coil springs are separate from each other. Thus, a desired valve spring device can be obtained by suitably selecting and combining the first and second coil springs that have different spring characteristics, depending on the surge resistance, set height, etc., required of the valve spring device.

In a valve spring device according to a preferred embodiment of the invention, at least some turns of a wire of the first coil spring or the second coil spring closely contact one another when a predetermined value is exceeded by a lift of the valve. Alternatively, the device may be configured so that at least some turns of the wire of the first coil spring or the second coil spring closely contact one another when the valve is closed.

Further, the valve spring device may be configured so that the second coil spring is compressed to be pre-loaded as the second coil spring is arrested by a stopper so as not to be stretched beyond a predetermined length, only the first coil spring is compressed and deformed as long as a lift of the valve is small, and the second coil spring is compressed to the predetermined length or less and deformed when the predetermined value is exceeded by the lift of the valve.

A valve train according to the present invention comprises the aforesaid valve spring device, a valve including a valve disc which opens and closes a port formed in a cylinder head of an engine, a shaft, and a retainer, and a drive mechanism which drives the shaft of the valve in an opening direction of the valve disc by means of a rotating cam.

BRIEF DESCRIPTION OF THE SEVERAL VIEWS OF THE DRAWING

FIG. 1 is a sectional view of a valve train provided with a valve spring device according to a first embodiment of the invention;

DETAILED DESCRIPTION OF THE INVENTION

Figure 2:
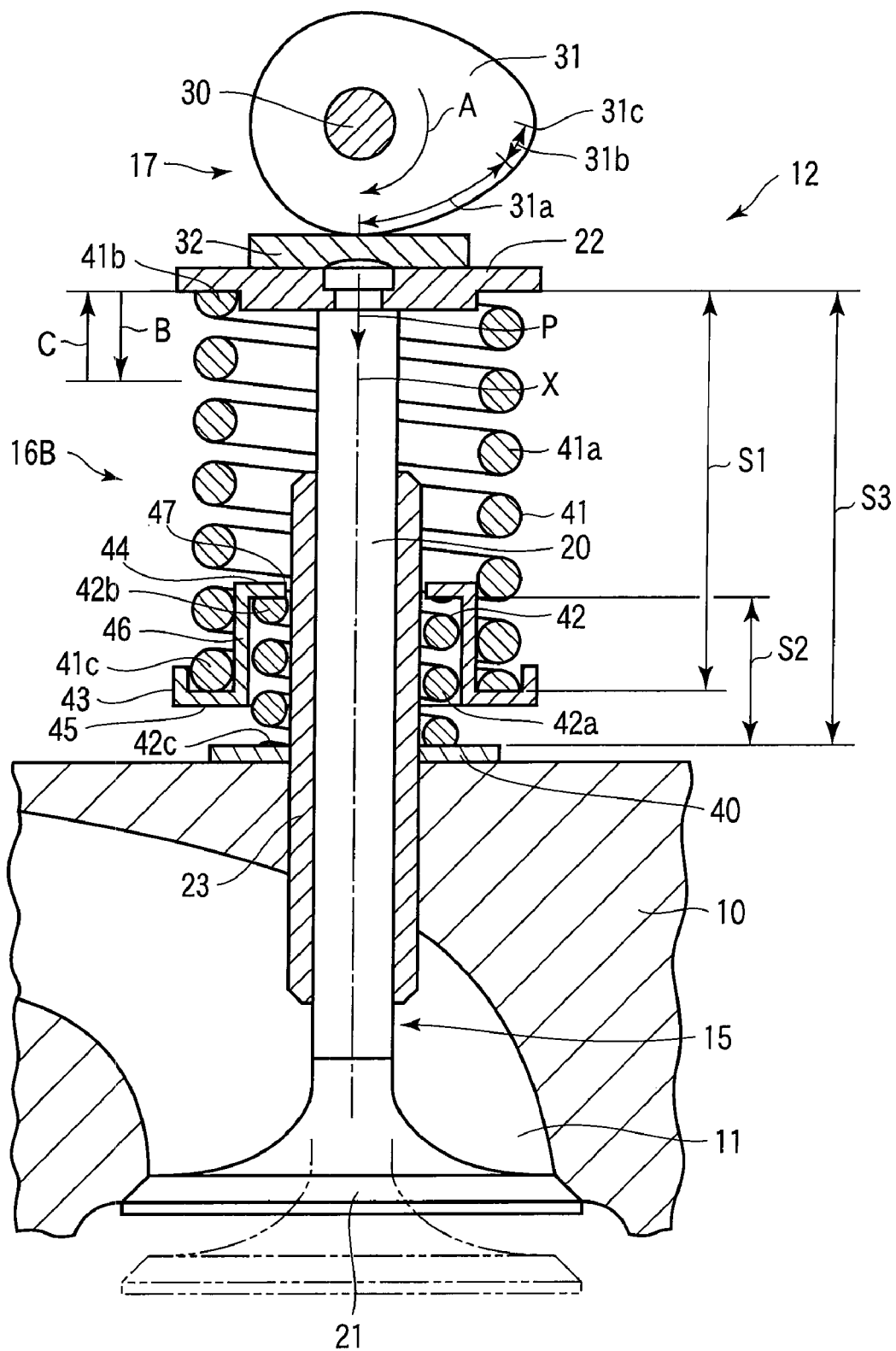
FIG. 2 is a sectional view of a valve train provided with a valve spring device according to a second embodiment of the invention.

A valve spring device according to a first embodiment of the present invention will now be described with reference to FIG. 1. As shown in FIG. 1, an intake port 11 is formed in a cylinder head 10 of an engine. The cylinder head 10 is provided with an intake valve train 12. The valve train 12 includes an intake valve 15, a valve spring device 16A, a drive mechanism 17, etc. The valve 15 opens and closes the intake port 11. The valve spring device 16A urges the valve 15 in its closing direction. The drive mechanism 17 drives the valve 15 in its opening direction.

The cylinder head 10 is provided with an exhaust port (not shown) and an exhaust valve train (not shown) for opening and closing the exhaust port. Since the exhaust valve train is constructed substantially in the same manner as the intake valve train 12, a description thereof is omitted herein, and the intake valve train 12 will now be described as a representative.

The valve 15 that is incorporated in the intake port 11 is provided with a shaft 20, a valve disc 21, a retainer 22, etc. The shaft 20 has an axis X. The valve disc 21 opens and closes the intake port 11. The retainer 22, which functions as a spring retaining member, is mounted on an end portion of the shaft 20. The shaft 20 extends along the X-axis. The shaft 20 is inserted into a cylindrical valve guide 23 which is mounted on the cylinder head 10. The shaft 20 can reciprocate integrally with the retainer 22 along the X-axis.

The drive mechanism 17 includes a camshaft 30, a cam 31 mounted on the camshaft 30, and a transmission member 32. The transmission member 32 is located between the valve 15 and the cam 31. The cam 31 rotates in the direction of arrow A in FIG. 1 around the camshaft 30 as a crankshaft (not shown) of the engine rotates.

When the cam 31 rotates in the direction of arrow A, the shaft 20 of the valve 15 is reciprocated along the X-axis by the transmission member 32. Specifically, the valve 15 reciprocates in the opening direction indicated by arrow B and the closing direction indicated by arrow C. An alternative form of the drive mechanism 17 is provided with a rocker arm (not shown) that is driven by a cam. The rocker arm is configured to push the valve 15 along the X-axis. In this case, the rocker arm functions as a transmission member.

The valve spring device 16A is located between a spring retaining portion 40 on the cylinder head 10 and the retainer 22. The valve spring device 16A is provided with a first coil spring 41 and a second coil spring 42, which are each formed of a compression coil spring, and a connecting member 43. The connecting member 43 connects the coil springs 41 and 42 in series with each other. The first and second coil springs 41 and 42 are arranged compressed between the retainer 22 and the spring retaining portion 40. An axial load P is applied to the shaft 20 of the valve 15 by the drive mechanism 17. The axial load P acts along the X-axis so as to compress the first and second coil springs 41 and 42.

The first coil spring 41 is formed by spirally winding a wire 41a of spring steel. The coil spring 41 includes a first end portion 41b on the upper side as in FIG. 1 and a second end portion 41c on the lower side. An end face of the first end portion 41b abuts the retainer 22. The second coil spring 42 is also formed by spirally winding a wire 42a of spring steel. The coil spring 42 includes a first end portion 42b on the upper side as in FIG. 1 and a second end portion 42c on the lower side. An end face of the second end portion 42c abuts the spring retaining portion 40. In the present embodiment, the number of turns of the first coil spring 41 is greater than that of the second coil spring 42. Alternatively, however, the first and second coil springs 41 and 42 may be equal in the number of turns, or the number of turns of the second coil spring 42 may be greater than that of the first coil spring 41.

The inside diameter (coil inside diameter) of the second coil spring 42 is greater than the outside diameter (coil outside diameter) of the first coil spring 41. A lower part of the first coil spring 41, that is, a part including the second end portion 41c along the X-axis, is inserted into the second coil spring 42. In other words, the first and second coil springs 41 and 42 are arranged telescopically. In addition, these coil springs 41 and 42 are connected in series with each other.

The connecting member 43 includes an inside spring seat 44, an outside spring seat 45, and a junction 46. The junction 46 is situated between the spring seats 44 and 45. The junction 46 extends along the X-axis. The second end portion 41c of the first coil spring 41 abuts the inside spring seat 44. The first end portion 42b of the second coil spring 42 abuts the outside spring seat 45. The connecting member 43 serves to regulate the relative radial positions of the first and second coil springs 41 and 42.

A through-hole 47 is formed in the central part of the connecting member 43. The shaft 20 of the valve 15 and the valve guide 23 are passed through the through-hole 47. The shaft 20 of the valve 15 and the guide 23 are passed along the X-axis within the coil springs 41 and 42.

The length of the first coil spring 41 in a mounted state is designated by S1, and that of the second coil spring 42 by S2. In the present embodiment, a part of the first coil spring 41 is inserted into the second coil spring 42. Thus, a length S3 of the valve spring device 16A is smaller than the sum of the respective lengths S1 and S2 of the first and second coil springs 41 and 42. Despite the use of the two types of coil springs 41 and 42, therefore, the set height of the valve spring device 16A can be reduced, and the shaft 20 of the valve 15 can be shortened. In consequence, the force of inertia of the valve train 12 that reciprocates at high speed can be reduced.

The diameter of the wire 42a of the second coil spring 42 of the present embodiment is equal to that of the wire 41a of the first coil spring 41. Alternatively, however, the diameter of the wire 42a of the second coil spring 42 may be greater than that of the wire 41a of the first coil spring 41 and vice versa. In short, the wire diameter, number of turns, coil diameter, etc., of each of the coil springs 41 and 42 are selected according to the specifications of the valve spring device 16A.

The following is a description of the operation of the valve train 12 provided with the valve spring device 16A of the present embodiment (FIG. 1).

When the engine rotates, the cam 31 of the drive mechanism 17 rotates in the direction of arrow A in FIG. 1 in association with the rotation of the crankshaft. As the cam 31 rotates in this manner, the valve 15 moves toward an open position indicated by two-dot chain lines in FIG. 1.

If the cam 31 in the state shown in FIG. 1 rotates in the direction of arrow A, for example, the shaft 20 of the valve 15 is pushed in the direction of arrow B by a second cam surface 31b that is continuous with the first cam surface 31a. Thereupon, the valve 15 is lifted toward the open position indicated by the two-dot chain lines in FIG. 1, and the first and second coil springs 41 and 42 are compressed simultaneously.

If the lift of the valve 15 exceeds a predetermined value, at least some turns of the wire 42a of the second coil spring 42 closely contact one another. When a top portion 31c of the cam 31 presses the valve 15, the compression amount of the coil springs 41 and 42 attains a maximum, and the valve 15 reaches the open position (maximum lift position). When the maximum lift position of the valve 15 is passed, the first and second coil springs 41 and 42 are deformed to be stretched, in contrast with the aforesaid case, whereupon the valve 15 returns to a closed position indicated by solid lines in FIG. 1.

Thus, the coil springs 41 and 42 of the present embodiment have load-deflection characteristics such that they are deformed by compression when the lift of the valve 15 is small and that the turns of the wire 42a of the second coil spring 42 closely contact one another while the lift is increasing.

When the engine is operated at high rotational speed, the first and second coil springs 41 and 42 vibrate at high speed along the X-axis, so that surge may possibly occur. If the first coil spring 41 undergoes surge, a surge wave propagates to the second coil spring 42. As the second coil spring 42 repeats close contact and separation, the natural frequency of the valve spring device 16A changes. Accordingly, the surge of the first coil spring 41 is suppressed. Thus, the load of the valve spring device 16A can be stabilized in the vicinity of a maximum lift such that the force of inertia of the valve 15 is maximum.

The valve spring device 16A of the present embodiment is configured so that the turns of the wire 42a of the second coil spring 42 closely contact one another while the valve 15 is being lifted. On the contrary, however, the device 16A may be configured so that the turns of the wire 41a of the first coil spring 41 closely contact one another while the valve 15 is being lifted.

FIG. 2 shows a valve train 12 provided with a valve spring device 16B according to a second embodiment of the present invention. The valve spring device 16B, like the valve spring device 16A of the first embodiment, is provided with a first coil spring 41 and a second coil spring 42. The first coil spring 41 abuts a retainer 22. The second coil spring 42 is supported by a cylinder head 10. The coil springs 41 and 42 are arranged compressed in series with each other between the retainer 22 and a spring retaining portion 40.

In the case of this embodiment, the outside diameter (coil outside diameter) of the second coil spring 42 is smaller than the inside diameter (coil inside diameter) of the first coil spring 41. A part of the second coil spring 42 including its end portion 42b along an X-axis is inserted into the first coil spring 41. The valve spring device 16B shares other configurations with the valve spring device 16A of the first embodiment.

A cam 31 in a valve-closed position shown in FIG. 2 rotates in the direction of arrow A. While a valve 15 is being lifted toward an open position, at least some turns of a wire 42a of the second coil spring 42 closely contact one another. In the valve spring device 16B of this embodiment, as in the valve spring device 16A of the first embodiment, the two types of coil springs 41 and 42 with different spring characteristics are arranged in series with each other. Thus, surge can be suppressed. In addition, a length S3 of the valve spring device 16B along the X-axis can be restrained from increasing. Alternatively, the valve spring device 16B may be configured so that the turns of a wire 41a of the first coil spring 41 closely contact one another while the valve 15 is being lifted.

Figure 3:
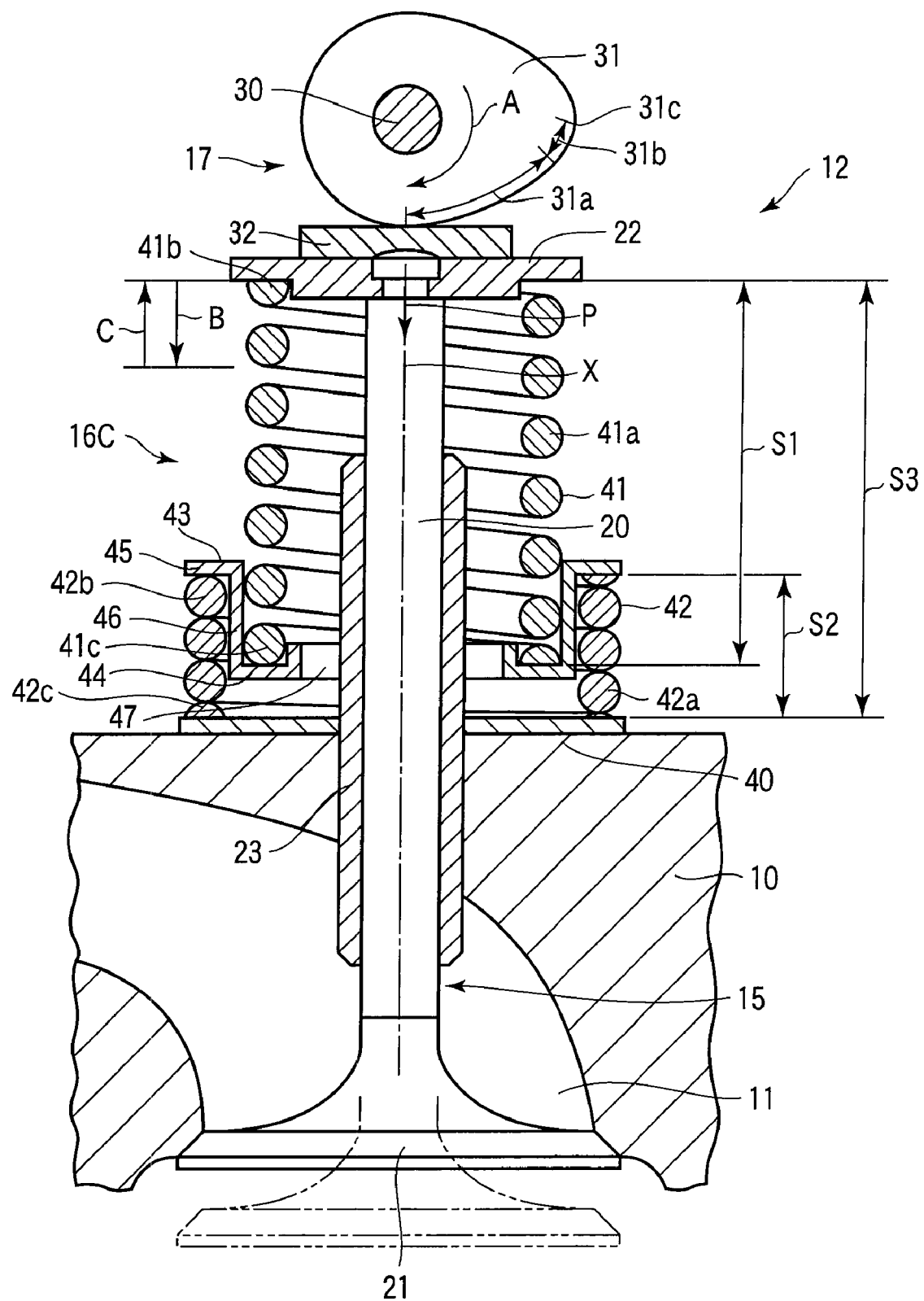
FIG. 3 is a sectional view of a valve train provided with a valve spring device according to a third embodiment of the invention.

FIG. 3 shows a valve train 12 provided with a valve spring device 16C according to a third embodiment of the present invention. The valve spring device 16C differs from the valve spring device 16A of the first embodiment (FIG. 1) in that the turns of a wire 42a of a second coil spring 42 closely contact one another when a valve 15 is closed. Specifically, in this valve spring device 16C, the turns of the wire 42a of the second coil spring 42 closely contact one another when a valve 15 is closed. The valve spring device 16C shares other configurations with the valve spring device 16A of the first embodiment.

A cam 31 in a valve-closed position shown in FIG. 3 rotates in the direction of arrow A. The valve 15 is lifted as a shaft 20 is pushed by the cam 31 so that a first coil spring 41 is compressed. As the engine is operated at high rotational speed, the first coil spring 41 vibrates at high speed along, an X-axis, whereupon a surge wave is produced and propagates to the second coil spring 42. Then, the second coil spring 42 repeats close contact and separation, whereupon the natural frequency of the valve spring device 16C changes in a high-speed region. Thus, surge is suppressed. Also in the valve spring device 16C of this embodiment, the two types of coil springs 41 and 42 with different spring characteristics are arranged in series with each other. Nevertheless, a length S3 along the X-axis can be restrained from increasing.

Figure 4:
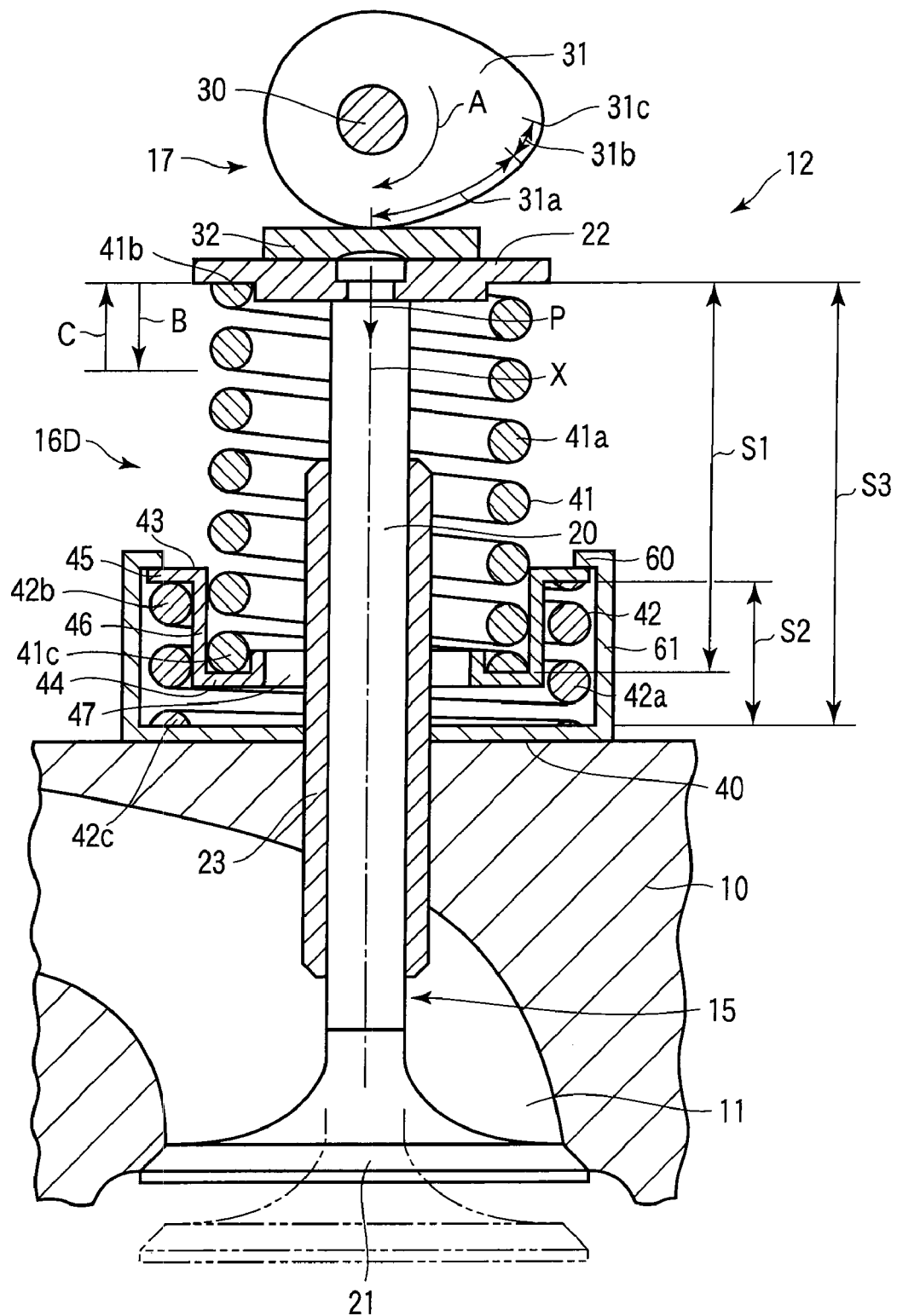
FIG. 4 is a sectional view of a valve train provided with a valve spring device according to a fourth embodiment of the invention.

FIG. 4 shows a valve train 12 provided with a valve spring device 16D according to a fourth embodiment of the present invention. In the description to follow, common numbers are used to designate common portions of the valve spring devices 16A and 16D of the first and fourth embodiments.

The valve spring device 16D, like those of the foregoing embodiments, is provided with a first coil spring 41 and a second coil spring 42. The first coil spring 41 abuts a retainer 22. The second coil spring 42 is supported by a cylinder head 10. The coil springs 41 and 42 are arranged compressed in series with each other between the retainer 22 and the cylinder head 10.

The inside diameter of the second coil spring 42 is greater than the outside diameter of the first coil spring 41. A part of the first coil spring 41 including its end portion 41c along an X-axis is inserted into the second coil spring 42. The coil springs 41 and 42 constitute a telescopically combined spring. The end portion 41c of the first coil spring 41 and an end portion 42b of the second coil spring 42 are connected in series with each other by a connecting member 43.

The first coil spring 41 is located compressed between the retainer 22 and an inside spring seat 44 of the connecting member 43. The length of the first coil spring 41 in a mounted state is designated by S1. When the first coil spring 41 is not pressed by a drive mechanism 17, its length is S1. A mounting load of the first coil spring 41 with the length S1 is a reaction force that is generated along the X-axis.

The second coil spring 42 is held pre-compressed or pre-loaded by a holding member 61 that includes a stopper 60. The length of the second coil spring 42 in a mounted state is designated by S2. The pre-load that is applied to the second coil spring 42 is higher than the mounting load of the first coil spring 41. The pre-load on the second coil spring 42 is higher than an axial load P that acts when the first coil spring 41 is compressed so that at least some turns of its wire 41a closely contact one another. Further, the pre-load on the second coil spring 42 is higher than the axial load P that acts when the first coil spring 41 is compressed so that almost all the turns of the wire 41a closely contact one another.

The load-deflection characteristics of the coil springs 41 and 42 are characteristics such that only the first coil spring 41 is deformed when the axial load P is not higher than a predetermined value and that both the first and second coil springs 41 and 42 are deflected when the axial load P exceeds the predetermined value.

The following is a description of the operation of the valve train 12 provided with the valve spring device 16D of the present embodiment (FIG. 4).

When the engine rotates, a cam 31 of the drive mechanism 17 rotates in the direction of arrow A in FIG. 4. A valve 15 moves in the direction of arrow B from a closed position indicated by solid lines in FIG. 4 to an open position indicated by two-dot chain lines. A first cam surface 31a deforms only the first coil spring 41 until at least some turns of the wire 41a of the first coil spring 41 closely or substantially closely contact one another. Thus, as long as the axial load P is low, only the first coil spring 41 is compressed so that its length S1 decreases.

When a shaft 20 is pressed by a second cam surface 31b so that the axial load P increases, at least some turns of the wire 41a of the first coil spring 41 closely contact one another. Thereupon, the load (reaction force) of the first coil spring 41 suddenly increases. Thus, the second coil spring 42 is also compressed so that its length S2 decreases. When a top portion 31c of the cam 31 presses the valve 15, the valve 15 reaches the open position (maximum lift position).

When the maximum lift position of the valve 15 is passed, the second coil spring 42 is stretched, in contrast with the aforesaid case, whereupon the connecting member 43 abuts the stopper 60. Thus, the second coil spring 42 is held by the stopper 60 when it is stretched to the mounting length S2. Further, the cam 31 rotates so that the valve 15 moves in its closing direction. As this is done, the first coil spring 41 is restored to the mounting length S1 and the valve 15 is fully closed.

Surge may possibly occur if the first coil spring 41 vibrates at high speed along the X-axis as the engine is operated at high rotational speed. Even if the first coil spring 41 undergoes surge, at least some turns of the wire 41a of the first coil spring 41 closely contact one another while the valve 15 is being lifted. Thereupon, a displacement in the direction of compression along the X-axis is restrained. Thus, a reduction in the load on the valve 15 can be suppressed, so that the occurrence of a jump or bounce can be prevented. In other words, the surge can be neutralized.

In the valve spring device 16D of the present embodiment, as in the cases of the foregoing embodiments, moreover, the coil springs 41 and 42 are divided from each other along the X-axis. Therefore, a surge wave that is produced in the first coil spring 41 when the surge is caused can be prevented from propagating to the second coil spring 42. Thus, the load of the valve spring device 16D can be stabilized in the vicinity of a maximum lift such that the force of inertia of the valve 15 is maximum.

Accordingly, the load of the first coil spring 41 can be set to be lower than that of a conventional valve spring, so that the friction loss can be reduced. Since the coil springs 41 and 42 are arranged telescopically, moreover, a length S3 along the X-axis can be reduced despite the use of the two types of coil springs 41 and 42 with different spring characteristics.

Figure 5:
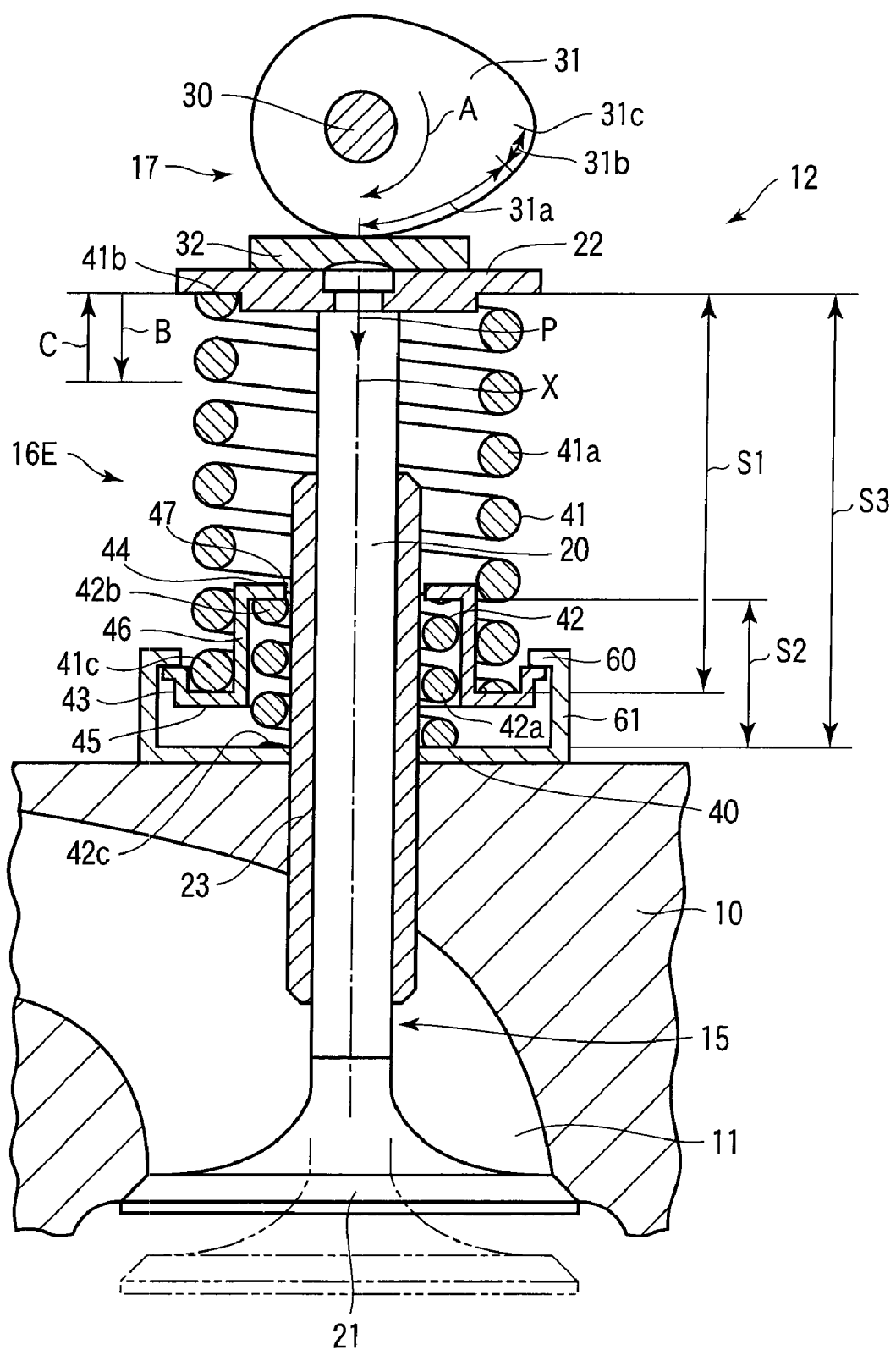
FIG. 5 is a sectional view of a valve train provided with a valve spring device according to a fifth embodiment of the invention.

FIG. 5 shows a valve train 12 provided with a valve spring device 16E according a fifth embodiment of the present invention. In this valve spring device 16E, as in the valve spring device 16D, a pre-load is applied to a second coil spring 42 by a stopper 60. The second coil spring 42 is maintained to have a mounting length S2 by the stopper 60. The outside diameter (coil outside diameter) of the second coil spring 42 is smaller than the inside diameter (coil inside diameter) of a first coil spring 41. A part of the second coil spring 42 including its end portion 42b along an X-axis is inserted into the first coil spring 41. The coil springs 41 and 42 constitute a telescopically combined spring. The valve spring device 16E shares other configurations and operation with the valve spring device 16D of the fourth embodiment (FIG. 4).

Also in this valve spring device 16E, the pre-load is applied to the second coil spring 42 by the stopper 60. As long as the lift of the valve 15 is small, therefore, only the first coil spring 41 is compressed so that its length S1 decreases. If the lift increases so that at least some turns of the first coil spring 41 closely or substantially closely contact one another, the second coil spring 42 is also compressed, so that the length S2 of the second coil spring 42 decreases.

Also in the valve spring device 16E of this embodiment (FIG. 5), surge can be suppressed for the same reason as in the case of the valve spring device 16D of the fourth embodiment (FIG. 4). Since the coil springs 41 and 42 are arranged telescopically, moreover, a length S3 along the X-axis can be reduced despite the use of the two types of coil springs 41 and 42.

The present invention is not limited to the embodiments described herein, and in carrying out the invention, its components, including the first and second coil springs and the connecting member, may be embodied in suitably modified forms.

What is claimed is:

1. A valve spring device which urges a valve incorporated in a port of an engine in a closing direction, the valve spring device comprising:
   a first coil spring located on a side of a retainer of the valve; and
   a second coil spring located on a side of a cylinder head and connected in series with the first coil spring,
   wherein:
      an inside diameter of the second coil spring is greater than an outside diameter of the first coil spring,
      a part of the first coil spring including an end portion along an axis is inserted into the second coil spring,
      the end portion of the first coil spring and an end portion of the second coil spring are connected to each other by a connecting member,
      a shaft of the valve passes within the first coil spring and the second coil spring, the first coil spring and the second coil spring are mounted between the retainer and the cylinder head and compressed to a first length and a second length, respectively, the second coil spring is compressed to be pre-loaded by being arrested by a stopper so as not to be stretched beyond the second length, only the first coil spring is compressed, to be shorter than the first length, when a lift of the valve is not higher than a predetermined value, and the second coil spring is compressed to be shorter than the second length in a state in which at least some turns of a wire of the first coil spring come into close contact with one another when the lift of the valve exceeds the predetermined value.

2. A valve train of an engine, comprising:

the valve spring device according to claim 1;

a valve including (i) a valve disc which opens and closes a port formed in a cylinder head of the engine, (ii) a shaft, and (iii) a retainer; and a drive mechanism which drives the shaft of the valve in an opening direction of the valve disc by a rotating cam.

3. A valve spring device which urges a valve incorporated in a port of an engine in a closing direction, the valve spring device comprising:

a first coil spring located on a side of a retainer of the valve; and a second coil spring located on a side of a cylinder head and connected in series with the first coil spring, wherein:

an inside diameter of the first coil spring is greater than an outside diameter of the second coil spring, a part of the second coil spring including an end portion along an axis is inserted into the first coil spring, an end portion of the first coil spring and the end portion of the second coil spring are connected to each other by a connecting member, a shaft of the valve passes within the first coil spring and the second coil spring, the first coil spring and the second coil spring are mounted between the retainer and the cylinder head and compressed to a first length and a second length, respectively, the second coil spring is compressed to be pre-loaded by being arrested by a stopper so as not to be stretched beyond the second length, only the first coil spring is compressed, to be shorter than the first length, when a lift of the valve is not higher than a predetermined value, and the second coil spring is compressed to be shorter than the second length in a state in which at least some turns of a wire of the first coil spring come into close contact with one another when the lift of the valve exceeds the predetermined value.

4. A valve train of an engine, comprising:

the valve spring device according to claim 3;

a valve including (i) a valve disc which opens and closes a port formed in a cylinder head of the engine, (ii) a shaft, and (iii) a retainer; and a drive mechanism which drives the shaft of the valve in an opening direction of the valve disc by a rotating cam.

\* \* \* \* \*